April 5, 1955  J. R. COOPER  2,705,769
CROSS-FILM CONTROLLED SYSTEM FOR PRODUCING PREDETERMINED
SELF-SYNCHRONOUS MOTOR DRIVE MOTION
Filed Jan. 31, 1950 2 Sheets-Sheet 1

INVENTOR.
JACK R. COOPER.
BY Wade Koontz
ATTORNEY
H. N. Losche
AGENT

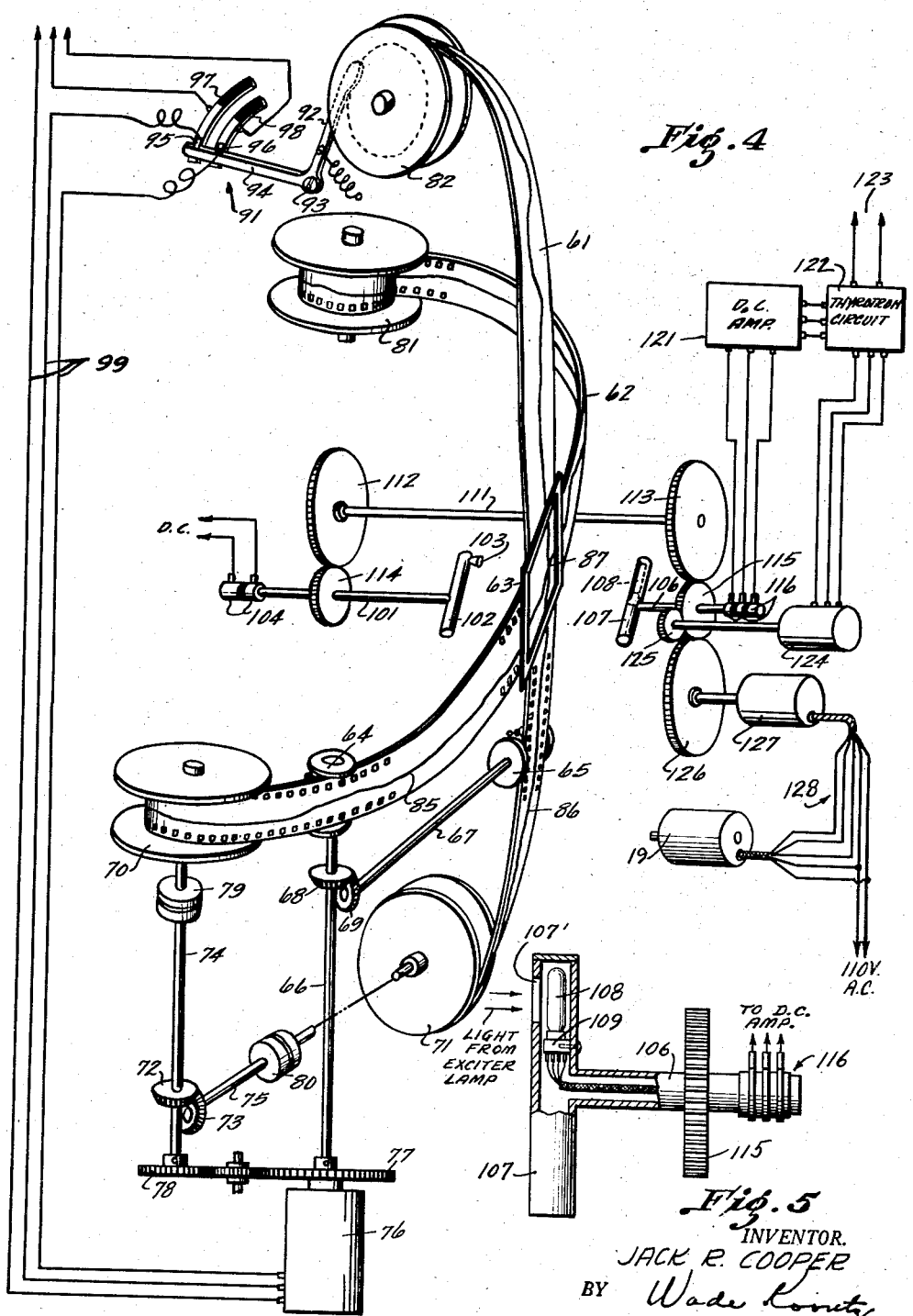

United States Patent Office 2,705,769
Patented Apr. 5, 1955

2,705,769

CROSS-FILM CONTROLLED SYSTEM FOR PRODUCING PREDETERMINED SELF-SYNCHRONOUS MOTOR DRIVE MOTION

Jack R. Cooper, Tulsa, Okla., assignor to the United States of America as represented by the Secretary of the Air Force Application January 31, 1950, Serial No. 141,404

6 Claims. (Cl. 318—162)

This invention relates to a control system for controlling a self-synchronous receiver motor in a predetermined manner and more particularly to the control of the self-synchronous receiver motor derived from a photoelectric cell follow-up system in which the photoelectric cell follows a transparent spot produced by related transparent traces in a pair of photographic films driven in crossed relation to mechanically rotate the rotor of a self-synchronous generator thus producing self-synchronous field signals transmitted to the self-synchronous receiver motor producing speed and rotation thereof in accordance with the plotted film traces.

While the present invention may have general application, it is particularly useful with, and adaptable to, gun and gun turret testing equipment, and it will be described in conjunction with such equipment to enable one skilled in the art to fully understand the objects, advantages, and features thereof.

Several means and methods are used in testing the accuracy of gun direction and of the power equipment used in directing or maneuvering the gun to enable gun turret technicians to redesign or correct the gun and gun turret systems for greater accuracy. To accomplish such gun turret tests under simulated conditions of field use, as for gun turrets used in aircraft, a simulated target is necessary. One such gun turret testing device utilizes a large construction as a bridge over a gun turret which gun turret is mounted such that pitch, yaw, and roll, those motions being characteristic of an airplane in flight, may be simulated. Suspended from the bridge over the gun turret is a crescent-shaped frame that is rotatable about a vertical axis. The crescent-shaped frame has a circular sector of track lying in a plane passing through the vertical axis with the center of curvature thereof lying on the vertical axis. A wagon is controllable to travel over the circular track and carries a movie projector which projects a target comprising the silhouette of an airplane onto a ground glass screen held in the wagon. The ground glass screen is at the focus of a parabolic mirror supported in the wagon so that the image on the screen may be formed infinitely far away. A large half-silvered directional mirror serves to make this image of the airplane visible to an observer at the gun turret. A particular photographic film for the projector is made for each attack with the silhouetted airplane having the proper size and aspect at each point along the flight path. The rotational movement of the crescent-shaped frame on its axis and of the travel of the wagon on its track provide the azimuthal and elevational movements respectively of the target airplane corresponding to the range dimension and attitude thereof provided by the movie projector. The movements of the crescent-shaped frame and of the wagon are each controlled by a self-synchronous receiver motor to provide the azimuthal and the elevational attitude of the target plane. The most widely accepted control means for controlling the speed and the direction of the wagon and of the crescent-shaped frame utilize cams for the purpose of providing control information through cam followers actuating self-synchronous transmitter generators connected to the respective self-synchronous receiver motors. Each cam set provides a particular target attack.

In accordance with the present invention, the target control means for providing proper movement of the wagon and of the crescent-shaped frame consists of a cross-film and photoelectric cell follow-up system for providing the information for each self-synchronous receiver motor. The cross-film target control device has two films driven to cross over each other at a synchronous speed. Each film has a transparent trace thereon which is so plotted and related to the trace on the companion film that, as the two films are driven at a synchronous speed, a transparent opening or spot will appear through the two films at the intersection of the traces that will always travel in a circle but with acceleration and speeds and in a direction determined by the film traces. On one side of the two films at the place of crossing is a photoelectric cell exciter lamp supported on a rotatable arm such that the exciter lamp sweeps a circle concentric with, and at a radius of, the circle of travel of the transparent spot through the films. On the opposite side of the films at their intersection is a photoelectric cell supported on an arm rotatable to carry the photoelectric cell in a circle concentric with, and at a radius of, the circle of travel of the transparent spot of the two films. The exciter lamp support and the photoelectric cell support are connected to rotate together with the exciter lamp positioned on one side of the films at their intersection directly opposite the photoelectric cell.

The exciter lamp and the photoelectric cell are mechanically connected to be rotatively powered by a servomotor. The photoelectric cell has two plates that are positioned to receive an equivalent amount of light from the exciter lamp, each plate being electrically coupled through a D.-C. amplifier and a thyratron circuit to control the servomotor speed to maintain accurate follow-up of the photoelectric cell with the transparent spot in the films. The servomotor also drives a self-synchronous generator which is electrically connected to transmit information to one of the self-synchronous receiver motors controlling the target. Where the self-synchronous generator of the cross-film system is connected to the self-synchronous motor operable to control the elevation of the wagon, and thus the target, the film pair will be chosen with traces thereon providing the proper elevational angle of the target from the gun turret in cooperation with the azimuth motion of the target provided by the azimuth cross-film system and the movie target image range. In this manner a predetermined attack by the target airplane image can be produced. It is therefore an object of this invention to provide a cross-film control device in which two films are driven at a synchronous speed and crossed, each film having a trace thereon so plotted and related to produce a transparent spot at their intersection which travels in a circular path at varying angular velocities and accelerations and in a direction dependent on the arrangement of the film traces, the transparent spot being followed by a photoelectric cell operable to control a load in accordance with the film traces to produce movement of the load in a predetermined manner.

These and other objects and advantages will become more apparent as the description proceeds when taken in conjunction with the accompanying drawings, in which:

Fig. 4 shows a schematic view of one of the cross-film target controlling devices in accordance with this invention; and Fig. 5 shows in vertical cross section the twin phototube and rotatable support therefor.

Figure 1:
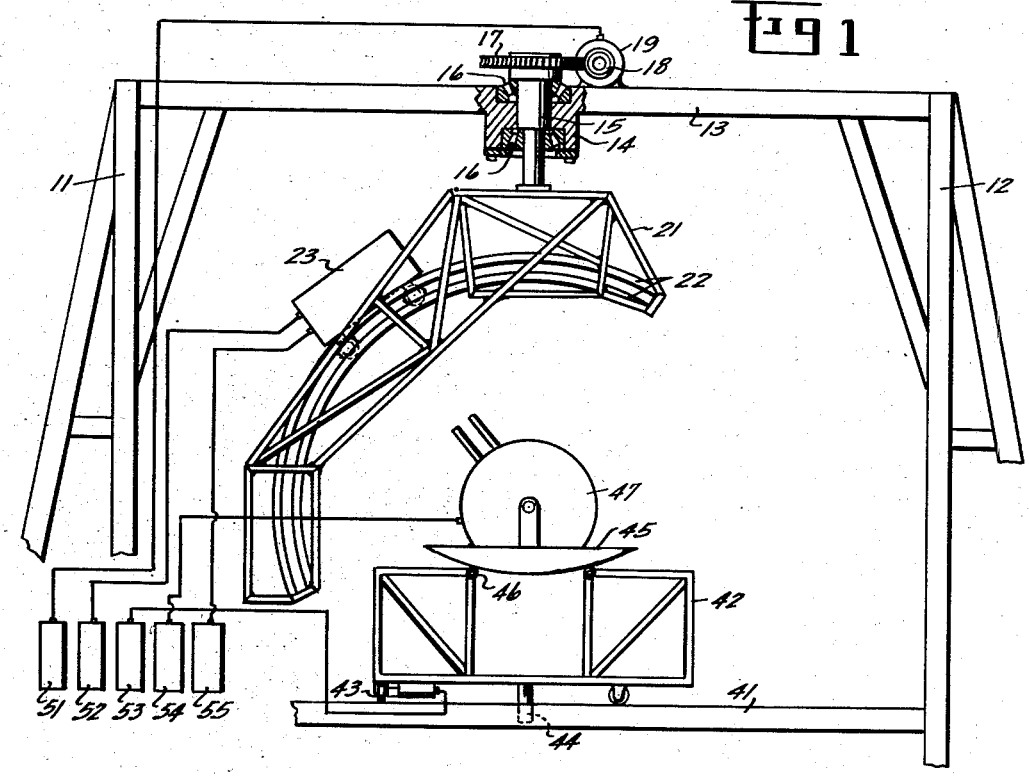
Fig. 1 shows a diagrammatic elevation of gun and gun control testing equipment with which the present invention is used.
Figure 2:
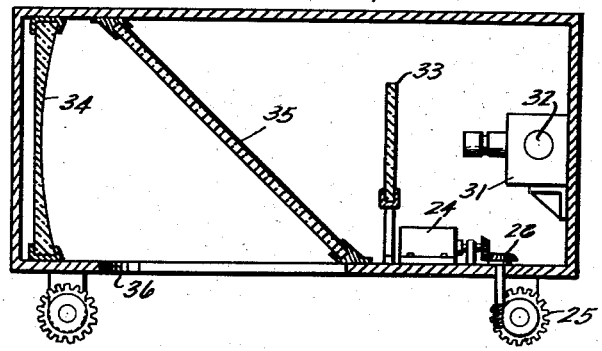
Fig. 2 is a sectional view of the wagon used for carrying the target producing projector of the testing equipment.
Figure 3:
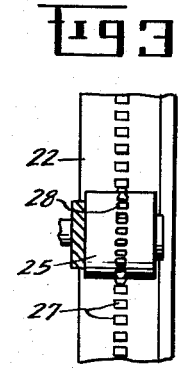
Fig. 3 shows an enlarged view of one of the wagon drive sprockets and a fragment of the wagon track.

Referring to Figs. 1, 2, and 3, there is shown two towers 11 and 12 having a bridge member 13 joining the tops of the towers to form an inverted U-shaped bridge structure. Centrally of the bridge member 13 is a hub portion 14 through which is vertically rotatively mounted a shaft 15 by roller type bearings 16. The top end of the shaft 15 has a gear 17 fixed thereto in engagement with a worm gear 18 driven by a self-synchronous receiver drive motor 19. The lower end of the shaft 15 has a crescent-shaped frame 21 fixed thereto which frame has a circular sector track 22 therein with the axis of revolution thereof intersecting the axis of the shaft 15. The crescent-shaped frame 21 is fixed near one of its ends to the shaft 15 such that the circular track 22 extends slightly more than 90° from the axis of the shaft 15 to permit a wagon 23 to travel a full 90° about the track from a position directly under the shaft 15. The wagon 23 is powered along the track by a self-synchronous drive motor 24 (see Fig. 2) operable to drive a pair of rollers 25 through gear and shaft means 26. The track 22 has perforations 27 therealong and the rollers 25 have sprocket teeth 28 thereon to provide a positive driving engagement between the rollers and the track.

Within the wagon 23 is a movie projector 31 driven by a servomotor 32. The movie projector is used to project a target, as the silhouette of an airplane, on a ground glass screen 33 with the target airplane having the proper size and aspect at each point along the path. The ground glass screen 33 is at the focus of a parabolic mirror 34 so that an image on the screen can be formed infinitely far away. A large half-silvered directional mirror 35 serves to make this image visible to an observer through the opening 36 at the intersection of the target elevation and azimuth axes which is the position of a gun turret, presently to be described.

Connected to the towers 11 and 12, or in a related position thereto on the floor or supporting surface, is a platform 41. A gun turret support 42 has rollers 43 on the bottom thereof that roll on the top surface of the platform 41, or a track may be used where advisable and desirable. The gun turret support has a central shaft 44 journaled in the platform 41 which prevents the support 42 from moving laterally. On the gun turret support is a roll platform 45 having circular tracks mounted on rollers 46 of the gun turret support to simulate roll of the vehicle, as an aircraft, carrying the gun. A gun turret 47 is mounted on the roll platform for rotation in the azimuthal and in the elevational angles as is conventional of gun turrets. The gun turret is arranged to seat a gun operator for testing the gun and controls. The gun turret operation in the azimuthal and in the elevational angles is under the control of the gunner while the azimuthal control of the gun turret support 42 and of the roll platform 45 are controlled by other means to simulate the yaw and roll of an aircraft in flight. Since the gun turret control, the gun turret support control, and the roll platform control are all unimportant to the understanding of the invention, these control means will not be described further, it being considered sufficient to understand that the movements of the gun turret, the gun turret roll and support platforms, the crescent-shaped frame, and the wagon are all recorded for test results of the gun and gun controls, or for indicating the trainee gunner's precision, where the device is used for gunnery training.

The elevation of the wagon and the rotation of the crescent-shaped frame 21 are under the control of target control devices 51 and 52 of a group of control devices 51–55 for the testing equipment such as the elevation control, the azimuth control, the elevation lead control, the azimuth lead control, and the range control, respectively. The present invention is directed to a control device one each of which may be used for each of the control devices illustrated as 51 to 55, but this invention will be described with respect to the target controlling devices for only the elevation and azimuth of the wagon since it is believed that such a description will provide a full and complete disclosure of the invention, its objects, its features, and its purposes.

One of these control devices is shown schematically in Fig. 4 wherein two films 61 and 62 are driven through a film frame 63, preferably at right angles although the films may be made to cross at other angles where deemed suitable or advisable. The two films are driven by film sprockets 64 and 65 at the same speed by reason of the film sprocket shafts 66 and 67 being geared together in a one-to-one relation by the gears 68 and 69. Each film is wound on a film take-up reel 70 and 71, respectively, both of which are geared to run together by the gears 72 and 73 through the respective shafts 74 and 75. The shaft 66 is directly coupled to a synchronous servomotor 76 that is also geared to drive the shaft 74 at a greater speed than the shaft 66. As here shown, the shaft 66 has a spur gear 77 thereon that rotates a spur gear 78 of a lesser number of teeth on the shaft 74. Between the gear 72 and the reel 70 on the shaft 74 is a friction clutch 79, and between the gear 73 and the reel 71 is a friction clutch 80 to permit the take-up reels to wind the films thereof at a tension determined by the friction of the clutches. Film reels 81 and 82 are mounted for free rotation to permit the films to be drawn therefrom.

Each film 61 and 62 has a transparent trace thereon as shown at 85 and 86, respectively. These transparent traces form a square transparent spot 87 in the area of intersection of the films in the frame 63. The traces have been so plotted on the two films that the transparent spot will always scribe a circular path. When the synchronous motor 76 is energized, the films 61 and 62 will be pulled across the frame 63 by the film sprocket wheels 64 and 65, and the films will be wound respectively on the film reels 70 and 71.

A film stop switch 91 is used to break the circuit to the synchronous motor 76 when the film is substantially near the end in the reels 81 and 82. The film stop switch 91 is operated by a lever arm 92 that is pivoted at 93, the outer end of which presses against the film edge face portion. A second lever arm 94 integral with the lever arm 92 carries a pair of electrically independent contacts 95 and 96 that are slidable over contact strips 97 and 98 limited in extent at the points where the lever arm 92 is near the reel hub, or a distance of two or three film thicknesses from the film reel hub, at which time the contacts 95 and 96 will ride off the contact strip and break the circuit in two of the three electrical supply conductors 99 connected to the synchronous motor 76. The synchronous motor 76 is also electrically coupled to the synchronous motor 32 of the projector to maintain proper target movements in range, elevation, and azimuth.

Behind one face of the frame 63, shown to the left of this frame in Fig. 4, is a shaft 101 axially aligned to the center of the frame 63. The end near the frame 63 carries a radial arm 102 on which is positioned an exciter lamp 103 radially outward to sweep a circle, when the shaft 101 is rotated, of the same diameter as the circular path of the transparent spot 87 produced by the films. The exciter lamp 103 receives current through slip rings and brushes 104 in the well known manner. In front of the films at the place of their crossing in the frame 63 is a shaft 106 rotatably mounted in axial alignment with the shaft 101 and it has a radial arm 107 supporting a two plate photoelectric cell 108 at a radial distance equal to that of the exciter lamp 103. The cell 108 is preferably in the form of a twin-type phototube designated No. 920 by the Radio Corporation of America. As shown in Fig. 5 the hollow radial arm 107 is provided with a light admission slot 107′ opposite the phototube. The phototube has two similar anodes and cathodes but the anode of one section is connected to the cathode of the other section, so that only three leads extend through the shaft 106 to the slip ring connections. The base of the phototube 108 is secured in the hollow arm 107 by any suitable bracket or socket 109. The two shafts 101 and 106 are made to rotate together by a third shaft 111 having spur gears 112 and 113 of equal size on its ends meshing respectively with a spur gear 114 on the shaft 101 and a spur gear 115 on the shaft 106 which are of equal size. The photoelectric cell 108 is electrically connected through slip rings and brushes 116 on the shaft 106 to a D.-C. amplifier 121. The D.-C. amplifier is coupled to a thyratron circuit 122 which receives electrical power through the conductors 123. The thyratron circuit has its output coupled to a servomotor 124 which has a small spur gear 125 on its rotor shaft that is in mesh with the spur gear 115 for the purpose of rotating the exciter lamp 103 and the photoelectric cell 108 at speeds controlled by the photoelectric cell.

Also meshing with the spur gear 115 is a spur gear 126 on the rotor shaft of a self-synchronous generator 127 to be rotated in a direct speed relation with the photoelectric cell. The self-synchronous generator 127 is coupled by conductors 128 to one of the self-synchronous receiver motors of the gun target elevational or azimuthal drive to give motion thereto corresponding to the rotation of the self-synchronous generator 127.

All of the elements of the control device shown in Fig. 4 are, in actual practice, compactly arranged in a supporting framework or container, as will be understood by one skilled in the art, with the exciter lamp 103 and the photoelectric cell properly hooded for operation.

For the purpose of illustration of the inventive concept let it be assumed that the self-synchronous generator 127 is coupled electrically to the self-synchronous receiver motor 19 (see Figs. 1 and 4) which controls the rotation of the crescent-shaped frame 21 about its axis through the shaft 15 for providing azimuthal direction of the target image carried by the wagon 23. Another cross-film target control device, as shown and described in Fig. 4 and used as the target control device 52, will have its self-synchronous generator, corresponding to the self-synchronous generator 127 in Fig. 4, coupled to the self-synchronous receiver motor 24 for driving the wagon 23 over its track providing elevational movements for the target image. In actual practice, however, a transformer is used in the electrical coupling between the self-synchronous generators and motors to provide the necessary electrical power to these motors to enable them to handle their respective loads. Other cross-film control devices are likewise used for the control devices 53, 54, and 55, all the cross-film control devices of which have the films prepared to provide a prearranged target control and gun support operation. The operation of all the control devices with respect to the gun testing equipment is not necessary, however, to a complete understanding of the invention and therefore the operation of only one target control device with respect to its related element in the gun testing equipment will be explained.

A pair of films, as 61 and 62, shown in Fig. 4, are started on the film take-up reels 70 and 71, in a manner well known in the art, such that the beginning of the traces 85, 86 are superimposed in the frame 63. The voltage supply is connected to the synchronous motor 76 and the synchronous motor 32, to the thyratron circuit 122, to the exciter lamp 103, and to the self-synchronous generator-motor system 127, 19 through switches in the usual manner. The synchronous motor 76 operates to pull the two films 61 and 62 through the frame 63 at a predetermined rate causing the transparent spot 87 to travel in a circular path. Light from the exciter lamp 103 strikes the photoelectric cell 108 which cell controls the current conduction through its plates to the D.-C. amplifier 121. As the spot 87 moves in its circular path the light intensity will tend to decrease on one of the photoelectric cell plates to cause an unbalance in current conduction between the two plates which is amplified in the D.-C. amplifier and used to control the voltage to the servomotor 124 through the thyratron circuit to accelerate or decelerate the speed of the motor 124 to bring the photoelectric cell into a position where the plates have equal light intensity thereon. In this manner the photoelectric cell is made to follow the circular movements, accelerations and decelerations, of the spot 87 in either rotative direction. The rotative speed and direction are produced in the self-synchronous generator 127 through the mechanical gear connection 115, 126 and this motion is transmitted electrically to the self-synchronous receiver motor for rotating the crescent-shaped frame 21 in predetermined azimuthal directions required for the target. This azimuthal target motion is coordinated with other motions given to the target image airplane for a predetermined aerial attack during which time a gunner is directing the gun turret which movements are all recorded on graphs for study of gun and gun controlling means accuracy. When the films 61 and 62 are unwound from the reels 81 and 82 such that only a few turns remain, the lever means 92, 94 will be tilted clockwise to the point where the contacts 95 and 96 will ride off the contact strips 97 and 98 to break the circuit to the synchronous motor 76 and the synchronous motor 32. The films can then be re-wound or replaced for future operation of the gun testing equipment.

Where it is desirable to use the cross-film control device for gunnery training, or for speed regulation of various devices, as camera reels, or the like, it is only necessary to couple the self-synchronous generator 127 to a self-synchronous receiver motor mechanically connected to drive a device in a certain manner corresponding to the speed and acceleration of the spot 87. Innumerable speed and acceleration conditions can be met by the arrangement of traces on paired photographic films as described herein.

It is well recognized that it is quite possible for a self-synchronous receiver motor to get "out of step" with its related self-synchronous generator by slipping into another electrical quadrant. Where desirable and necessary, a second companion self-synchronous generator geared to run off the same shaft as the principal generator 127 at a greatly reduced speed and coupled electrically in the circuit 128 in a manner known to those skilled in the art, may be used to maintain the self-synchronous generator 127 and its self-synchronous motor in proper step or the same electrical quadrant.

While I have shown and described a preferred embodiment of my invention, it is to be understood that various modifications and changes may be made in various features of construction and arrangement of parts without departing from the spirit and scope of my invention and I desire to be limited only by the scope of the appended claims.

What I desire to secure by Letters Patents is:

1. In gun testing equipment, a target controlling device comprising: two photographic films each having a transparent trace thereon; means for moving said two films at a synchronous speed in crossed relation whereby the transparent traces thereon produce a transparent spot movable in accordance with the intersection of said traces, said traces being arranged to cause said spot to travel in a circular path; light responsive means adjacent said films at the place of their crossing movable in a circular path capable of following the movements of said spot; and a self-synchronous generator-motor system having the rotor of said self-synchronous generator connected to said last mentioned means to be rotated in accordance with the rotative movements of said last-mentioned means and said rotor of said self-synchronous motor being connectible to produce motion of a gun target whereby target motion is produced in accordance with the arrangement of said traces on said films.

2. A device for controlling the speed and direction of a self-synchronous motor to control a mechanical load in a predetermined manner comprising; a pair of motion picture photographic films each having a transparent trace thereon; a film drive sprocket for driving each film, said film drive sprockets being geared together in one-to-one relation for driving said films at a synchronized speed and the transparent traces being so arranged to produce a transparent spot movable in a circular path at speeds and in a direction determined by said traces; a light source and a light responsive element rotatively mounted on opposite sides of the film at a radius equivalent to the radius of the circular path of said spot and concentric thereto to follow the circular movements of said spot; and a self-synchronous generator-motor system having the rotor of said self-synchronous generator connected to rotate with said light responsive element whereby the self-synchronous motor will produce rotor speeds in angular directions determined by the traces on said film pair.

3. A device for controlling the speed and direction of a self-synchronous motor to control a mechanical load in a predetermined manner comprising; a pair of motion picture photographic films each having a transparent trace thereon; a film drive sprocket for driving each film; a spur gear associated with each film drive sprocket and being in mesh to drive said films at a synchronous speed in crossed relation, said film traces being so arranged to produce a transparent spot at the point of intersection of said traces that moves in a circular path; a shaft having one end adjacent one face of said films in axial alignment with the center of said circular path, said shaft having a radial arm on said one end and an exciter lamp on said radial arm a radial distance equal to the radius of said circular path; a second shaft having one end thereof adjacent the other face of said films and having a radial arm on said one end of the second shaft and a photoelectric cell on said last mentioned arm a radial distance equal to the radius of said circular path; means positively associating said two shafts mechanically to rotate in unison such that a beam of light from the exciter lamp to said photoelectric cell passes along the circular path of said transparent spot when said shafts are rotated; and a self-synchronous generator-motor transmission system, the rotor of said self-synchronous generator being mechanically coupled to said second shaft to cause a rotation thereof directly proportional to the rotation of said second shaft whereby the self-synchronous motor produces rotor rotation thereof at a speed and direction in accordance with the arrangement of the traces on said photographic films.

4. A device for controlling the speed and direction of a self-synchronous motor in a predetermined manner comprising; a photoelectric cell and an exciter lamp coupled mechanically to sweep circular paths in parallel planes and of equal radii; a self-synchronous generator-motor system having the rotor of said self-synchronous generator mechanically associated with the mechanical coupling of the photoelectric cell and the exciter lamp to be rotated in a direct proportion to the rotation of said photoelectric cell to transmit rotational information to said self-synchronous motor; a pair of photographic films each having a transparent trace thereon and driven at a synchronous speed in crossed relation to produce a transparent spot, the transparent traces being so arranged to cause said transparent spot to move in a circular path concentric with and of a radius equal to the radius of the circular sweep of said photoelectric cell and said exciter lamp; motive means for rotating said photoelectric cell and said exciter lamp in their circular paths; and means connecting said photoelectric cell and said motive means responsive to the conduction of the photoelectric cell to control said motive means in a manner to cause said photoelectric cell to follow said transparent spot whereby said self-synchronous motor rotor is driven at speeds and in rotational directions in accordance with the traces on said films.

5. A control device for controlling the speed and direction of a self-synchronous motor in a predetermined manner comprising; a pair of photographic films each having a transparent trace thereon; means for moving said films at a synchronous speed in crossed relation to produce a transparent spot at the intersection of said traces, said traces being so arranged to cause said transparent spot to move in a circular path; a light source in back of one surface of said films at their intersection; an element rotatable to cover a circular plane parallel to and in close relation with said films at their intersection; a photoelectric cell fixed to said element a radial distance equal to the radius of the circular path of said spot; motive power means for rotating said element; means coupling said photoelectric cell and said motive power means responsive to the conduction of said photoelectric cell to control the speed and direction of said motive power means to cause said photoelectric cell to follow said transparent spot; and a self-synchronous generator having its rotor mechanically coupled to said motive power means whereby the self-synchronous generator is capable of transmitting rotational information to a related self-synchronous motor in accordance with the traces on said films.

6. A control device as set forth in claim 5 wherein said motive power means is an electric servomotor; said photoelectric cell has two plates arranged radially of the rotatable element, each plate being responsive respectively to the leading and trailing edges of said transparent spot; and said means coupling said photoelectric cell and said motive power means comprises a D.-C. amplifier and a thyratron circuit, said D.-C. amplifier being operative to amplify the voltage information from the photoelectric cell plates for controlling the thyratron circuit to energize said electric servomotor in a direction corresponding to the plate information signal from the photoelectric cell to maintain substantially an equivalent amount of light to fall on said photoelectric cell plates from said light source whereby said photoelectric cell is made to follow said transparent spot.

References Cited in the file of this patent

UNITED STATES PATENTS 2,512,256   O'Connor, Jr. _____ June 20, 1950